June 20, 1967   M. L. LARSON   3,326,949
MOLYBDENYL (V) BISACETYLACETONATE AND METHOD OF PREPARING SAME
Filed May 21, 1963
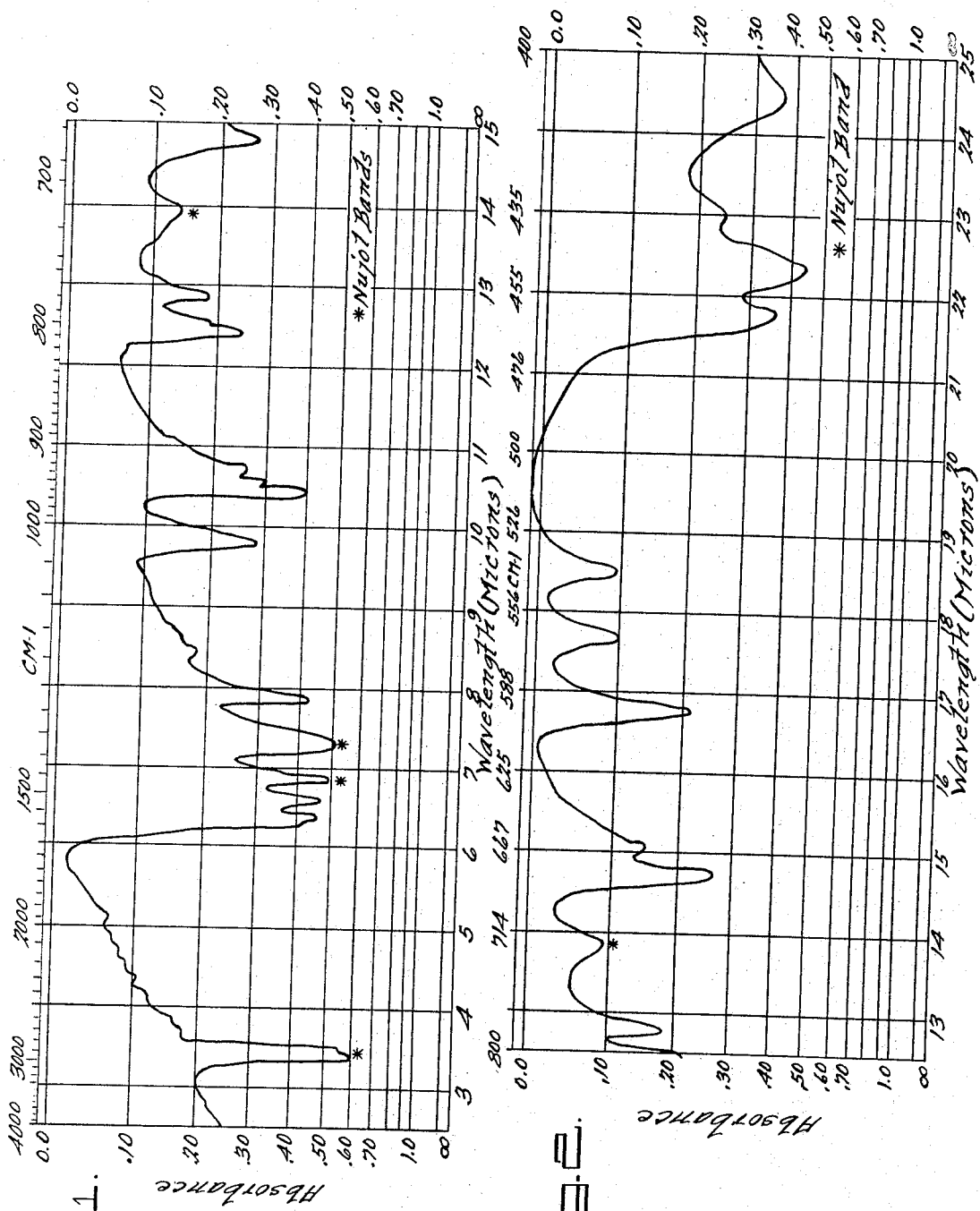
INVENTOR.
Melvin L. Larson
BY
Barnes, Dickey & Pierce
ATTORNEYS.

United States Patent Office 3,326,949
Patented June 20, 1967

3,326,949
MOLYBDENYL (V) BISACETYLACETONATE AND METHOD OF PREPARING SAME
Melvin L. Larson, Royal Oak, Mich., assignor to American Metal Climax, Inc., New York, N.Y., a corporation of New York
Filed May 21, 1963, Ser. No. 282,006
4 Claims. (Cl. 260—429)

The present invention broadly relates to organometallic compounds and more particularly to a new molybdenyl (V) bisacetylacetonate and to suitable methods for preparing this compound.

Organometallic compounds and particularly organomolybdenum compounds of the general type to which the present invention is applicable possess catalytic characteristics which make them adaptable for use as catalysts in various homogeneous solutions for polymerization, oxidation, hydrogenation, amination, hydration or epoxidation reactions, for example, which are becoming of increasing importance in the chemical processing and petrochemical industries. The new compound comprising the present invention is a pentavalent molybdenum organo complex which possesses utility as a catalyst as well as in other uses including its use as an intermediate in synthesizing other compounds.

The principal object of the present invention is to provide a new molybdenum (V) organo complex consisting of brown molybdenyl (V) bisacetylacetonate;

$$Mo_2O_3(C_5H_7O_2)_4$$

$\mu$-oxo-dioxotetrakis (2,4-pentanedionato) dimolybdenum (V).

Another object of the present invention is to provide novel methods for synthesizing and isolating molybdenyl (V) bisacetylacetonate which are commercially practicable and yield the compound in substantially high percentages.

Other objects and advantages of the present invention will become apparent on a reading of the following description taken in conjunction with the following drawings, wherein:

FIGURE 1 is an infrared absorption spectrogram of molybdenyl (V) bisacetylacetonate in the sodium chloride region prepared as a Nujol mull; and FIG. 2 is an infrared absorption spectrogram of molybdenyl (V) bisacetylacetonate prepared as a Nujol mull in the potassium bromide region.

The compound comprising the present invention consists of a brown crystalline solid having a melting point of about 284–285° C. Characterization of the compound reveals that it is an oxygen-bridged molybdenum (V) complex corresponding to the formula $Mo_2O_3(C_5H_7O_2)_4$ which can be conveniently described in chemical terminology as $\mu$-oxo-dioxotetrakis (2,4-pentanedionato) dimolybdenum (V), or a brown crystalline pentavalent molybdenyl bisacetylacetonate exhibiting characteristic absorption bands in the infrared region at the following frequencies expressed in reciprocal centimeters: 961, 948, 943, 935 (doublet): 813, 800, 781, 678, 662, 595, 565, 541, 459, 447, 435, and 408. The aforementioned structural formula, chemical description and definition by its characteristic absorption bands in the infrared region are alternative equivalent definitions of the compound comprising the present invention.

Molybdenyl (V) bisacetylacetonate is synthesized in accordance with one embodiment of the present invention by subjecting molybdenum (III) acetylacetonate to atmospheric oxygen effecting a rather rapid oxidation thereof which is accompanied by an evolution of heat, smoke, and sometimes accompanied by red glow spots on the material. A more controlled oxidation of molybdenum (III) acetylacetonate is achieved by a stepwise reaction with pure oxygen in which it was further established that acetylacetone is a major organic product of the oxidation reaction. The starting material, molybdenum (III) acetylacetonate; tris (2,4-pentanediono) molybdenum (III); $Mo(C_5H_7O_2)_3$, is a dark purple, crystalline solid which has a melting point of about 228–229° C. and as hereinbefore set forth is susceptible to oxidation attack. The brown molybdenyl bisacetylacetonate oxidation reaction product is readily purified by subjecting it to multiple recrystallizations from acetylacetone. Usually two recrystallizations are adequate to provide a substantially pure product having a stable melting point of about 284–285° C.

The refined molybdenyl (V) bisacetylacetonate is of substantially higher chemical stability than the corresponding yellow hexavalent molybdenyl (VI) acetylacetonate, $MoO_2(C_5H_7O_2)_2$, which has a melding point of about 185° C. and which is characterized as being readily decomposed by most organic solvents, is hydrolytically unstable and is readily subjected to ultraviolet promoted oxidation-reduction in the presence of water. In contrast, the brown molybdenyl (V) bisacetylacetonate has greater thermal stability, is stable toward water, and is stable toward photochemically induced oxidation-reduction in air. It is insoluble in water, ethanol, tetrahydrofuran, diethyl ether, and carbon tetrachloride at room temperature and is soluble in chloroform, methylene chloride, and p-dioxane.

It was initially proposed that the brown pentavalent molybdenyl bisacetylacetonate comprised an isomer of the yellow hexavalent molybdenum bisacetylacetonate due to the similarity in many of their properties. Further characterization, however, and particularly comparisons of their visible and infrared absorption spectra have clearly established the brown pentavalent molybdenyl bisacetylacetonate to comprise a new compound. The elemental composition of the brown pentavalent molybdenyl bisacetylacetonate based on the formula $Mo_2O_3(C_5H_7O_2)_4$ was determined to be: Mo, 29.95; C, 37.98; H, 4.50 in comparison to a calculated elemental composition of: Mo, 30.16; C, 37.75; H, 4.43. As will be noted, the determined and calculated values of the elemental composition of brown molybdenyl bisacetylacetonate correspond quite closely. The calculated elemental composition of the yellow hexavalent molybdenyl bisacetylacetonate based on the formula $MoO_2(C_5H_7O_2)_2$ was calculated at: Mo, 29.42; C, 36.82; H, 4.33.

Further substantiation of the identity of the brown pentavalent molybdenyl bisacetylacetonate is obtained from the visible absorption spectrum of the material dissolved in methylene chloride. The yellow hexavalent molybdenyl bisacetylacetonate is transparent in the 350–800 millimicron region whereas the brown pentavalent molybdenyl bisacetylacetonate exhibits definite absorption. Due to the rapid solvolytic decomposition of the compound, the absorption spectrum must be determined immediately after the preparation of the solution. The characteristic visible absorption peaks of the brown molybdenyl bisacetylacetonate are set forth in the following table:

ABSORPTION PEAK, MAX.

| Millimicrons | CM⁻¹ | $E_{1cm.}$.1% | E [1] | $Log_{10}$ E |
|---|---|---|---|---|
| 485 | 20,619 | 196 | 6,236 | 3.79 |
| 400 [2] | 25,000 | 65 | 2,068 | 3.32 |
| 327 | 30,581 | 304 | 9,672 | 3.99 |

[1] Molar Extinction Coefficient.
[2] Broad, sometime a shoulder.

Infrared spectrographic analyses were also conducted on both the yellow hexavalent and brown pentavalent molybdenyl bisacetylacetonates employing a Perkin-Elmer model 21 instrument in which the samples were prepared as Nujol mulls. The absorption spectrum of the brown molybdenyl bisacetylacetonate in the sodium chloride region is illustrated in FIGURE 1 and the spectrum in the potassium bromide region is illustrated in FIGURE 2. As noted, the characteristic absorption bands of the Nujol medium have been indicated by an asterisk on the spectrograms. A characteristic absorption peak of the brown molybdenyl bisacetylacetonate as shown in FIGURE 1, occurs at about 10.4 microns (960 cm.$^{-1}$) which clearly differentiates this material from the yellow hexavalent molybdenum bisacetylacetonate.

The following table contains a tabulation of the absorption peaks of the yellow hexavalent and brown pentavalent molybdenyl bisacetylacetonate facilitating a comparison between their spectra:

INFRARED ABSORPTION PEAKS, CM.$^{-1}$

| $MoO_2(C_5H_7O_2)_2$ | $Mo_2O_3(C_5H_7O_2)_4$ |
| --- | --- |
|  | 961 s |
|  | 948 m, sh |
| 930 s | 943/935 m, doublet |
| 897 s |  |
|  | 813 m |
| 794 s | 800 m, sh |
|  | 781 m |
| 680–667 s | 678 s |
| 650 w | 662 w |
| 575 s | 595 s |
| 548 m | 565 m |
|  | 541 m |
| 459 s, sh | 459 s |
| 451 s | 447 s |
|  | 435 s |
| 407 s | 408 s |

Wherein: s=strong; m=medium; w=weak; sh=shoulder.

It will be apparent from a comparison of the principal absorption peaks of the infrared absorption spectrum obtained on the brown molybdenyl bisacetylacetonate in comparison to the yellow molybdenyl bisacetylacetonate that the brown molybdenyl bisacetylacetonate is characterized by a more complicated absorption spectrum which is also indicative of its more complicated molecular structure. While it cannot be definitely specified at the present time as to which absorption bands in the spectrum of the brown molybdenyl bisacetylacetonate are due to the Mo—O—Mo bridge, it appears that the 450–400 cm.$^{-1}$ region is the most sensitive. The strong absorption of the brown molybdenyl bisacetylacetonate at 960 cm.$^{-1}$ which is absent in the yellow molybdenyl bisacetylacetonate is characteristic of the Mo=O stretch of pentavalent molybdenum complexes.

The foregoing characterization data were obtained on the pentavalent brown molybdenyl bisacetylacetonate derived from the controlled oxidation of molybdenum (III) acetylacetonate. Two alternate satisfactory methods will now be described by way of example for satisfactorily preparing the brown pentavalent molybdenyl bisacetylacetonate in substantially high yields. It will be understood that these examples are provided by way of further illustration and are not intended to be limiting of the scope of the present invention as set forth in the subjoined claims.

*Example I*

A reaction mixture was prepared by adding 5.0 grams (0.0154 mole) ammonium oxopentachloromolybdate (V). $(NH_4)_2MoOCl_5$ to 60 milliliters (58.6 gm., 0.585 mole) acetylacetone. The reaction mixture was stirred during which 500 milliliters of water were gradually added accompanied by the formation of dark-brown, heavy globules. Upon trituration and extended stirring, a brown solid was separated. After drying, the solid was found to weigh 3.52 gm. (0.00553 mole $Mo_2O_3(C_5H_7O_2)_4$ or 72% yield) and had a melting point of 271–272° C. (decomp.). Infrared absorption analyses of the reaction product in the potassium bromide region, revealed the reaction product to have a spectrum corresponding to that shown in FIGURE 2. One recrystallization of the product from acetylacetone effected a purification thereof and a corresponding elevation of its melting point to 279–280° C.

In accordance with the method as set forth in the foregoing example, it will be apparent that 2 moles of acetylacetone are required for each mole of ammonium oxopentachloromolybdate (V) to produce the brown pentavalent molybdenyl bisacetylacetonate. Other alkali oxopentachloromolybdate (V) compounds can be satisfactorily employed including lithium, sodium, potassium as well as ammonium in addition to mixtures thereof. Conventionally, the mole ratio of the acetylacetone in excess of the theoretical required amount is employed to facilitate the reaction and to obtain substantially high yields. It is further contemplated that a reaction mixture can be prepared by first dissolving an alkali oxo-pentachloromolybdate (V) in water to which the acetylacetone can be gradually added during agitation forming the brown precipitate.

*Example II*

A reaction mixture was prepared by dissolving 14.40 gm. (0.10 mole) of molybdic oxide, $MoO_3$ to 100 milliliters of concentrated hydrochloric acid. To this solution 9.60 gm. (0.10 gm. atom) of elemental molybdenum metal powder was added as a reducing agent for reducing the hexavalent molybdic oxide to the pentavalent state. The resultant system was agitated and gradually heated over a 2½ hour period to a temperature of 84° C. During this period complete dissolution of the molybdic oxide occurred forming a brownish-green solution. The undissolved elemental molybdenum metal powder was thereafter separated by filtration from the solution. A total of 7.92 gm. of elemental molybdenum powder was recovered indicating that 1.68 gm. (0.0175 gm. atom) had dissolved.

To the resultant brownish-green filtrate was added 100 milliliters (97.6 gm., 0.975 mole) acetylacetone. The resultant solution was thereafter agitated during which dilute ammonium hydroxide was slowly added effecting a neutralization of the solution and accompanied by the formation of a brown solid precipitate. The brown precipitate was separated from the solution by filtration, washed with water, dried, and was found to weigh 22.7 gm. (indicating a 71% yield of pentavalent molybdenyl bisacetylacetonate based on the starting molybdic oxide). A purification of the sample was achieved by a single recrystallization from acetylacetone providing brown crystals having a melting point of 284–285° C. (decomp.), whose sodium chloride region infrared absorption spectrum was identical to the spectrum as shown in FIGURE 1.

It is also contemplated in accordance with the method as set forth in Example II, that alternate suitable reducing agents can be employed for reducing the hexavalent molybdenum to the pentavalent state such as, for example, mercury, zinc, etc. It is preferred, however, to employ molybdenum in order to avoid the introduction of an extraneous metal ion in the reaction mixture. The reduction of the hexavalent molybdenum to the pentavalent state is facilitated by heating the hydrochloric acid system within a temperature range of from room temperature up to about 110° C. Subsequent neutralization of the filtrate derived from the reduction reaction can be achieved by employing alternate satisfactory bases such as sodium hydroxide, for example, but ammonium hydroxide constitutes the preferred material.

Each of the methods as set forth in Examples I and II as hereinabove described, are believed to involve the $(Mo(O)OMo(O))^{+4}$ cation in aqueous solution which reacts with the acetylacetone to form the brown molybdenyl bisacetylacetonate. Accordingly, alternate satisfactory starting materials can be employed which yield the aforementioned cation in aqueous solution for reaction with acetylactone.

To further substantiate that the brown molybdenyl bisacetylacetonate is a molybdenum (V) complex, the brown molybdenyl bisacetylacetonate was dissolved in concentrated hydrochloric acid yielding a green solution. The green color was not extracted with chloroform, and it was changed to a brown color upon dilution with water. This solution gave a strong thiocyanate test for $Mo^{+5}$. Reacidification of the brown aqueous solution with concentrated hydrochloric acid effected a regeneration of the green color. On the assumption that the dissolution of the brown molybdenyl bisacetylacetonate occurred without any attendant reduction-oxidation reactions, the foregoing color tests confirm the compound to comprise a molybdenum (V) complex.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. $\mu$-oxo-dioxotetrakis (2,4-pentanedionato) dimolybdenum (V).

2. The method of preparing brown pentavalent molybdenyl bisacetylacetonate which comprises the steps of providing a quantity of molybdenum (III) acetylacetonate, oxidizing said molybdenum (III) acetylacetonate with free oxygen, and thereafter isolating the pentavalent molybdenyl bisacetylacetonate from the oxidation reaction product.

3. The method of preparing brown pentavalent molybdenyl bisacetylacetonate which comprises the steps of agitating a reaction mixture comprising an alkali oxopentachloromolybdate (V), acetylacetone, and water for a period of time sufficient to effect a coreaction between the constitutents and the formation of pentavalent molybdenyl bisacetylacetonate, and thereafter isolating the pentavalent molybdenyl bisacetylacetonate from the reaction mixture.

4. The method of preparing brown pentavalent molybdenyl bisacetylacetonate which comprises the steps of dissolving hexavalent molybdic oxide in hydrochloric acid forming a solution, reducing at least a portion of the molybdic oxide to the pentavalent state, adding acetylacetone to the solution, agitating said solution for a period of time to effect interreaction between the constituents, neutralizing said solution forming a percipitate of pentavalent molybdenyl bisacetylacetonate, and thereafter isolating said molybdenyl bisacetylacetonate from the solution.

References Cited

Gilbert T. Morgan et al., Journal Chemical Society, London 1928, pages 3252–3256.

Larson et al., Inorganic Chemistry, volume 1, No. 4, November 1962, page 858.

TOBIAS E. LEVOW, *Primary Examiner.*

HELEN M. McCARTHY, *Examiner.*

H. M. S. SNEED, *Assistant Examiner.*